US007847959B2

(12) United States Patent
Love

(10) Patent No.: US 7,847,959 B2
(45) Date of Patent: Dec. 7, 2010

(54) POINT OF SALE PRINTERS PROVIDING SECURE NETWORK TUNNELING

(75) Inventor: Shannon Andrew Love, Garner, NC (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 11/551,909

(22) Filed: Oct. 23, 2006

(65) Prior Publication Data

US 2008/0144075 A1 Jun. 19, 2008

(51) Int. Cl.
*G06F 3/12* (2006.01)
(52) U.S. Cl. .................................... 358/1.14; 358/1.15
(58) Field of Classification Search ............... 358/1.14, 358/1.15
See application file for complete search history.

(56) References Cited

U.S. PATENT DOCUMENTS

| 6,314,476 | B1 * | 11/2001 | Ohara ........................ 710/15 |
|---|---|---|---|
| 7,486,695 | B1 * | 2/2009 | AbdelAziz et al. .......... 370/466 |
| 7,574,737 | B1 * | 8/2009 | Loh ............................ 726/15 |
| 2004/0227971 | A1 * | 11/2004 | Clough et al. .............. 358/1.14 |
| 2005/0223228 | A1 * | 10/2005 | Ogawa et al. ............... 713/168 |
| 2005/0261970 | A1 * | 11/2005 | Vucina et al. ................. 705/16 |
| 2006/0072144 | A1 * | 4/2006 | Dowling et al. ............ 358/1.15 |

\* cited by examiner

*Primary Examiner*—King Y Poon
*Assistant Examiner*—Allen H Nguyen
(74) *Attorney, Agent, or Firm*—Yee & Associates, P.C.; Jason O. Piche

(57) ABSTRACT

A processor implemented method and data processing system are provided for providing secure network tunneling. A request is received at a printer to transmit data to a network server. A secure network tunnel is established between the printer and the network server. The data is transmitted from the printer to the network server over the secure network tunnel. A server acknowledgement is received at the printer that the data has been received by the network server.

10 Claims, 4 Drawing Sheets

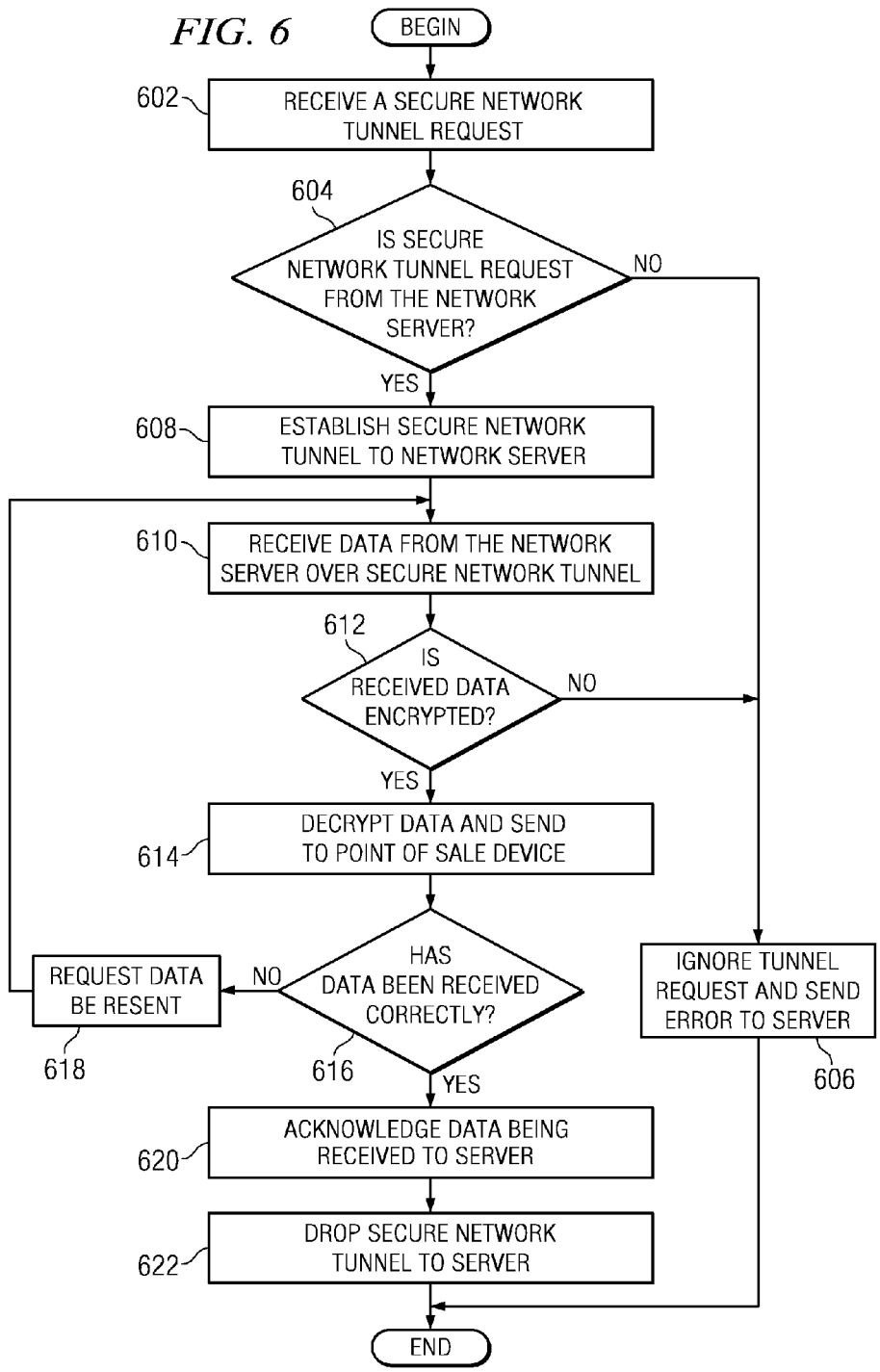

POINT OF SALE PRINTERS PROVIDING SECURE NETWORK TUNNELING

BACKGROUND OF THE INVENTION

1. Field of the Invention

The present invention relates generally to point of sale devices. More specifically, the present invention relates generally to a processor implemented method and data processing system which enables a point of sale printer to create and use secure network tunnels.

2. Description of the Related Art

Point of sale (POS) is a term that is often used in connection with hardware and software for checkout systems, such as cash registers, optical scanners, magnetic card readers, special terminals, and printers. Reading product tags, updating inventory, and checking credit are some of the operations performed at the point of sale.

Point of sale systems evolved from the mechanical cash registers of the first half of the 20th century. Examples of this type of register include the National Cash Register (NCR) registers operated by a crank and the lever-operated Burroughs registers. These registers recorded data on journal tapes or paper tape and required an extra step to transcribe the information into the retailer's accounting system. The next step in evolution was to move to operation by electricity. An example of this type of register was the National Cash Register Class 5 cash register. In 1973, new registers that were driven by computers were introduced, such as the International Business Machines (IBM) 3653 Store System and the National Cash Register 2150. The year 1973 also brought about the introduction of the UPC/EAN barcode readers on the point of sale systems. In 1986, the point of sale systems became based on personal computer technology with the introduction of the International Business Machines 4683.

During the late 1980s and throughout the 1990s, standalone credit card devices were developed so credit card processing could be more easily and securely added. These relatively simple devices have evolved in recent years to allow multiple applications, such as a credit card, gift card, age verification, and employee time clock to reside on one device. As of 2005, retail point of sale systems were among the most sophisticated and powerful computer networks in commercial use. However, point of sale networks are frequently vulnerable to malicious attempts to spy for private consumer data such as a credit card, social security, or bank account numbers.

BRIEF SUMMARY OF THE INVENTION

The illustrative embodiments provide for secure network tunneling between a printer and a network server. The illustrative embodiments receive a request at a printer to transmit data to a network server. The illustrative embodiments establish a secure network tunnel between the printer and the network server. The illustrative embodiments transmit the data from the printer to the network server over the secure network tunnel. Then, the illustrative embodiments receive a server acknowledgement at the printer that the data has been received by the network server.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 illustrates an exemplary operation of receiving data at a point of sale printer in accordance with an illustrative embodiment.

DETAILED DESCRIPTION OF THE INVENTION

Figure 1:
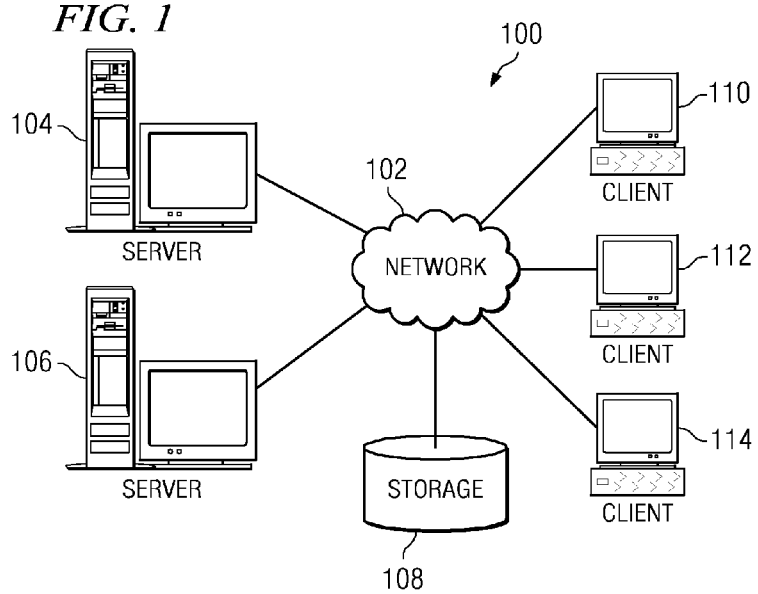
FIG. 1 depicts a pictorial representation of a network of data processing systems in which the illustrative embodiments may be implemented.
Figure 2:
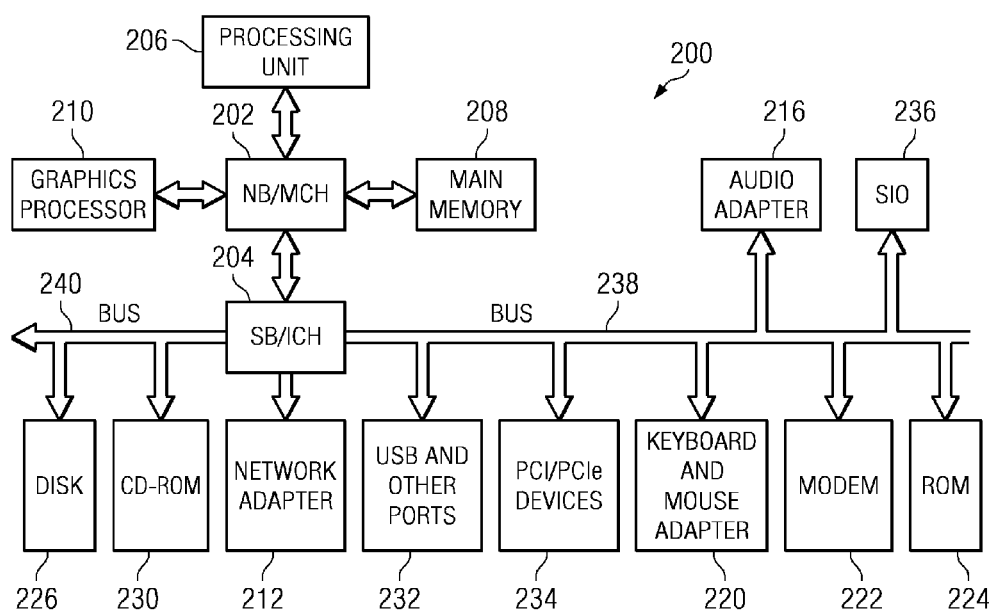
FIG. 2 shows a block diagram of a data processing system in which the illustrative embodiments may be implemented.

The illustrative embodiments provide for enabling a point of sale printer to create and use secure network tunnels in order to authenticate and encrypt network traffic between a point of sale system or kiosk and a network server in a manner transparent to the point of sale system. With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. Clients 110, 112, and 114 may also be point of sale devices, such as cash registers, optical scanner, magnetic card reader, special terminals, and printers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which the illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using processor implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, point of sale device, or telephone device in addition to taking the form of a PDA.

Figure 3:
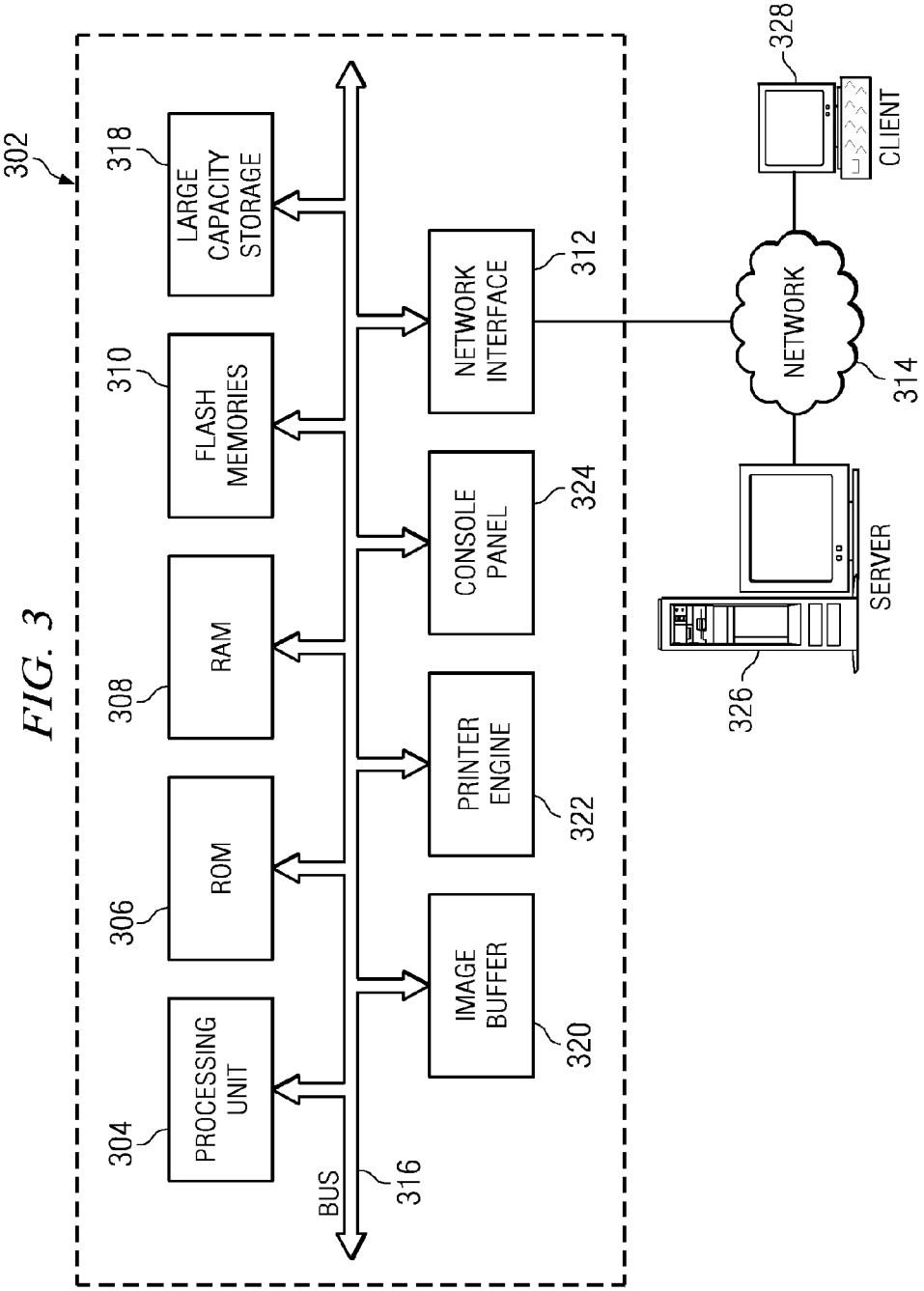
FIG. 3 is a block diagram showing an electric connection of a network printer in accordance with an illustrative embodiment.

FIG. 3 is a block diagram showing an electric connection of a network printer in accordance with an illustrative embodiment. Network printer 302 is an example of a point of sale device. As shown in FIG. 3, network printer 302 has processing unit 304 for carrying out various kinds of processing and integrally controlling each section, read-only memory (ROM) 306 for storing various kinds of computer programs, random-access memory (RAM) 308 as a work area for processing unit 304, flash memories 310 as second and third memories for storing various kinds of set information, and network interface 312 for carrying out communications with network 314 connected to each other with bus 316. Network 314 is a network, such as network 102 of FIG. 1.

Bus 316 is also connected to large-capacity storage 318 as a first memory like that for a hard disk drive, image buffer 320 for extending a bit image for printing, printer engine 322 for printing an image written in image buffer 320 according to an electronic photographing system or other printing system, and console panel 324 equipped with various kinds of keys for receiving various kinds of operations from users and liquid crystal display (LCD) for displaying various kinds of messages, via a predetermined interface and an I/O. Network 314 may be connected with server 326 and client 328.

The illustrative embodiments provide secure network tunneling for point of sale printers. The illustrative embodiments combine traditional point of sale printer functions with the functions of Ethernet bridge devices. This combination provides a secure network tunnel for point of sale devices to enable over wired or wireless network connections. A secure network tunnel utilizes public networks to conduct private data communications. Many secure network tunnel implementations use the Internet as the public infrastructure and a variety of specialized protocols to support private communications through the Internet. Tunneling is a transmission of data through a network in a manner that routing nodes in the network are unaware that the transmission is part of a private network. Tunneling is generally performed by encapsulating the private network data and protocol information within the public network protocol data so that the tunneled data is not available to anyone examining the transmitted data frames. A tunnel in a secure network is a connection between nodes that communicate with each other in the secure network tunnel.

Figure 4:
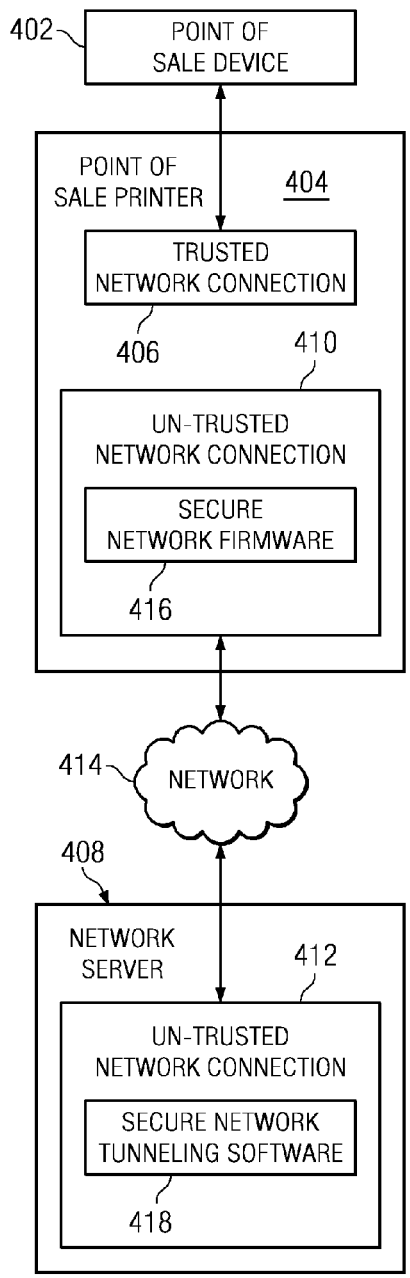
FIG. 4 depicts a functional block diagram of a point of sale (POS) system in accordance with an illustrative embodiment.

FIG. 4 depicts a functional block diagram of a point of sale (POS) system in accordance with an illustrative embodiment. Point of sale device 402 may be client devices, such as client 110, 112, or 114 of FIG. 1, and point of sale printer 404 may be a printer, such as network printer 302 of FIG. 3. Point of sale device 402 may be, for example, a cash register, kiosk, special terminal, or other computer or computing device serving the role of performing point of sale functions. Point of sale device 402 may be connected to point of sale printer 404 through trusted network connection 406, which may be a RS-232 connection, Universal Serial Bus (USB) connection, Ethernet connection, or other form of device connection. Point of sale printer 404 may further be connected to network server 408 through un-trusted network connection 410 in point of sale printer 404 and un-trusted network connection 412 in network server 408. Network 414, through which point of sale printer 404 connected to network server 408, may be either a wired or wireless network. If network 414 is a wireless network, then point of sale printer 404 may connect to network 414 via an internal 802.11 connection or other wireless connectivity technology. The 802.11 connection may be 802.11a, b, g, n, or some follow-on technology. If network 414 is a wired connection, then point of sale printer 404 may connect to network 414 through a wired connection, such as an Ethernet connection or other form of wired connection.

Un-trusted network connection 410 contains secure network firmware 416 that creates a secure network tunnel to network server 408 and encrypts all data that originates from point of sale printer 404 or traffic originating from trusted network connection 406 bound to network server 408. Network server 408 has secure network tunneling software 418 that is able to decrypt data sent from point of sale printer 404. Some exemplary secure network tunneling protocol that may be implemented in secure network tunneling software 418 is a virtual private network (VPN) tunneling protocol, point-to-point tunneling protocol (PPTP), Internet Protocol Security (IPSec), or layer two tunneling protocol (L2TP). Likewise, network server 408 may create a secure network tunnel to point of sale printer 404, and data sent from network server 408 is encrypted by secure network tunneling software 418 and decrypted by secure network firmware 416. If network 414 were maliciously accessed, data sent to point of sale printer 404 would be ignored by secure network firmware 416. If secure network firmware 416 detects malicious access, secure network firmware 416 sends an error or notification to network server 408 that a malicious access was attempted. All of the secure network tunneling and encryption/decryption is hidden from devices connected to trusted network connection 406, such as point of sale device 402.

Figure 5:
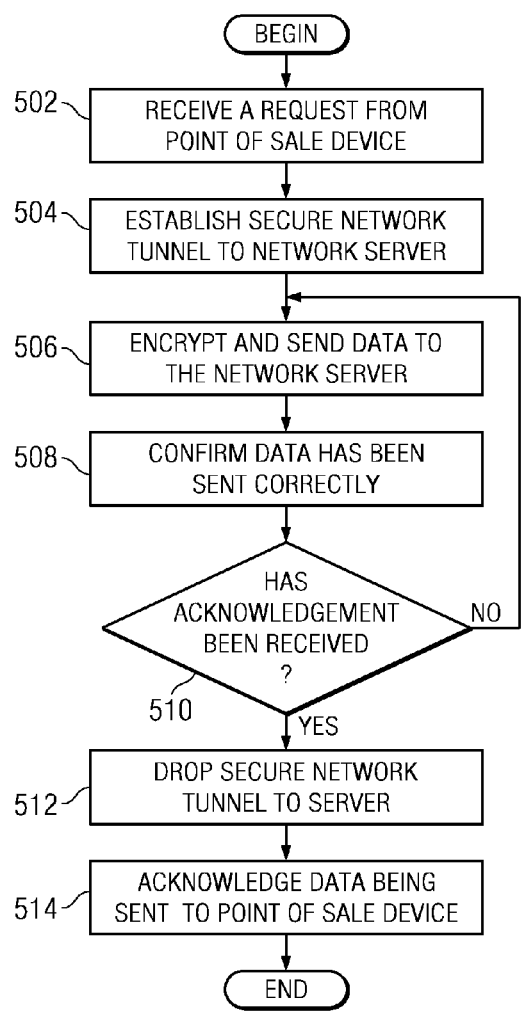
FIG. 5 illustrates an exemplary operation of a transmission from a point of sale printer in accordance with an illustrative embodiment.

FIG. 5 illustrates an exemplary operation of a transmission from a point of sale printer in accordance with an illustrative embodiment. As the operation begins, the point of sale printer receives a request from another point of sale device (step 502). The request includes data that is to be sent to the network server and is received in a trusted network connection, such as trusted network connection 406 of FIG. 4. The point of sale printer establishes a secure network tunnel to the network server using secure network firmware, such as secure network firmware 416 of FIG. 4 (step 504). Once the connection is established, the point of sale printer, using the secure network firmware, encrypts the data included in the connection request and sends the encrypted data to the network server using an un-trusted network connection, such as un-trusted network connection 410 of FIG. 4 (step 506). The point of sale printer confirms that the data is sent correctly by receiving an acknowledgement of data receipt from the network server (step 508). Next, a determination is made as to whether an acknowledgement has been received from the network server (step 510). If at step 510 any response other than an acknowledgement is received, the operation returns to step 506. If at step 510 an acknowledgement is received, the point of sale printer drops the secure network tunnel to the server (step 512). Then the point of sale printer acknowledges data being sent to the point of sale device that initiated the request (step 514), with the operation terminating thereafter.

FIG. 6 illustrates an exemplary operation of a receiving data at a point of sale printer in accordance with an illustrative embodiment. As the operation begins, a secure network tunnel request is received at an un-trusted network connection, such as un-trusted network connection 410 of FIG. 4 (step 602). Secure network firmware in the un-trusted network connection determines whether inbound network traffic is an authentic connection from the unsecured network connection based on the tunneling method chosen for the implementation—L2TP, IPSec, PPTP, etc. (step 604). If the secure network tunnel request is not from an authorized network server, the point of sale printer ignores the tunnel request and sends an error to the network server indicating that a malicious access has been attempted (step 606) with the operation ending thereafter. If at step 604 the secure network tunnel request is from an authorized network server, the point of sale printer establishes a secure network tunnel to the network server (step 608). The point of sale printer receives data from the network server over the secure network tunnel (step 610).

Then, the point of sale printer determines if the received data is encrypted using secure network firmware (step 612). If the data is not encrypted, the point of sale printer ignores the tunnel request and sends an error to the network server indicating that a malicious access has been attempted (step 606) with the operation terminating thereafter. If at step 612 the data is encrypted, the data is decrypted and sent to the point of sale device using a trusted network connection, such as trusted network connection 406 of FIG. 4 (step 614). Next, point of sale printer waits for the point of sale device to determine if the received data is correct (step 616). If at step 616 the point of sale device indicates that the data has been received incorrectly, the point of sale printer sends a request to the network server to resend data (step 618) with the operation retuning to step 610. If at step 616 the point of sale device indicates that the data has been received correctly, the point of sale printer sends an acknowledgement to the network server (step 620). Then the point of sale printer drops the secure network tunnel to the network server (step 622), with the operation terminating thereafter. All of the secure network tunneling and encryption/decryption is transparent to the point of sale device.

Thus, the illustrative embodiments provide for secure network tunneling between a printer and a network server. A printer receives a request to transmit data to a network server. A secure network tunnel is established between the printer and the network server. The data is transmitted from the printer to the network server over the secure network tunnel. A printer receives a server acknowledgement that the data has been received by the network server.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

This invention applies to any device which contains one or more printing components, including but not limited to thermal, laser, ink, or impact type, which is typically used to produce receipts for transactions, and which may act as a gateway for a virtual private network tunnel for other devices.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to surface mounted control buttons and LCD displays) can be coupled to the device either directly or through intervening I/O controllers.

Network adapters may be embedded in the device, or may be available as a separate component which connects to the device using a proprietary or common coupling mechanism such as that used by a PCMCIA card. Network adapters includes both wired network adapters and wireless network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A processor implemented method for providing secure network tunneling, the processor implemented method comprising:

receiving, at a printer, a request to transmit data to a network server;
establishing a secure network tunnel between the printer and the network server;
transmitting the data from the printer to the network server over the secure network tunnel; and
receiving, at the printer, a server acknowledgement that the data has been received by the network server;
receiving, at the printer, a secure network tunnel request;
determining if the secure network tunnel request is from an authorized network server;
responsive to the secure network tunnel request origination from an unauthorized network server, ignoring the secure network tunnel request; and sending a first error from the printer to the authorized network server;
responsive to the secure network tunnel request origination from the authorized network server, establishing, by the printer, the secure network tunnel to the authorized network server; and
receiving, by the printer, the data over the secure network tunnel from the authorized network server; and
determining, by the printer, if the data is encrypted data;
responsive to the data being unencrypted data, ignoring the unencrypted data; and
sending a second error from the printer to the authorized network server;
responsive to the encrypted data being received, decrypting the encrypted data; and
sending the decrypted data from the printer to a device; and
receiving, at the printer, a device acknowledgement that the data has been received by the device; and
sending the device acknowledgement from the printer to the authorized network server that the data has been received.

2. The processor implemented method of claim 1, further comprising:
encrypting the data prior to transmitting the data from the printer over the secure network tunnel to the network server.

3. The processor implemented method of claim 1, wherein the request is received from a point of sale device in communication with the printer and wherein the secure network tunnel is transparent to the point of sale device.

4. The processor implemented method of claim 1, wherein the printer is a point of sale printer.

5. The processor implemented method of claim 1, wherein the secure network tunnel is at least one of a virtual private network tunnel, a point-to-point tunnel, or a layer two tunnel.

6. A data processing system in a printer comprising:
a bus system;
a communications system connected to the bus system;
a memory connected to the bus system, wherein the memory includes a set of instructions; and
a processing unit connected to the bus system, wherein the processing unit executes the set of instructions to receive, at the printer, a request to transmit data to a network server;
establish a secure network tunnel between the printer and the network server; transmit the data from the printer to the network server over the secure network tunnel; and receive, at the printer, a server acknowledgement that the data has been received by the network server;
receive, at the printer, a secure network tunnel request; determine if the secure network tunnel request is from an authorized network server;
responsive to the secure network tunnel request originating from an unauthorized network server, ignore the secure network tunnel request; and send a first error from the printer to the authorized network server;
responsive to the secure network tunnel request origination from the authorized network server, establish, by the printer, the secure network tunnel to the authorized network server; and
receive, by the printer, the data over the secure network tunnel from the authorized network server; determine, by the printer, if the data is encrypted data;
responsive to the data being unencrypted data, ignore the unencrypted data; and send a second error from the printer to the authorized network server;
responsive to the encrypted data being received, decrypt the encrypted data; and send the decrypted data from the printer to a device; and
receive, at the printer, a device acknowledgement that the data has been received by the device; and send the device acknowledgement from the printer to the authorized network server that the data has been received.

7. The data processing system of claim 6, wherein the processing unit executes the set of instructions to encrypt the data prior to transmitting the data from the printer over the secure network tunnel to the network server.

8. The data processing system of claim 6, wherein the request is received from a point of sale device in communication with the printer and wherein the secure network tunnel is transparent to the point of sale device.

9. The data processing system of claim 6, wherein the printer is a point of sale printer.

10. The data processing system of claim 6, wherein the secure network tunnel is at least one of a virtual private network tunnel, a point-to-point tunnel, or a layer two tunnel.

* * * * *